United States Patent
Osawa et al.

(10) Patent No.: US 8,060,368 B2
(45) Date of Patent: Nov. 15, 2011

(54) SPEECH RECOGNITION APPARATUS

(75) Inventors: Masanobu Osawa, Tokyo (JP); Reiko Okada, Tokyo (JP); Takashi Ebihara, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 876 days.

(21) Appl. No.: 11/992,938

(22) PCT Filed: Aug. 18, 2006

(86) PCT No.: PCT/JP2006/316257
§ 371 (c)(1),
(2), (4) Date: Apr. 1, 2008

(87) PCT Pub. No.: WO2007/066433
PCT Pub. Date: Jun. 14, 2007

(65) Prior Publication Data
US 2009/0228276 A1 Sep. 10, 2009

(30) Foreign Application Priority Data
Dec. 7, 2005 (JP) .................................. 2005-353695

(51) Int. Cl.
*G10L 15/06* (2006.01)
(52) U.S. Cl. ........................ 704/257; 704/243; 704/10
(58) Field of Classification Search ................ 704/235, 704/251–257, 270.1, 243, 10
See application file for complete search history.

(56) References Cited

U.S. PATENT DOCUMENTS

| | | | |
|---|---|---|---|
| 6,233,559 B1* | 5/2001 | Balakrishnan | 704/275 |
| 6,360,201 B1* | 3/2002 | Lewis et al. | 704/251 |
| 6,487,534 B1* | 11/2002 | Thelen et al. | 704/270 |
| 6,757,655 B1* | 6/2004 | Besling et al. | 704/270.1 |
| 7,003,457 B2* | 2/2006 | Halonen et al. | 704/235 |

FOREIGN PATENT DOCUMENTS

| | | |
|---|---|---|
| EP | 0 789 224 A2 | 8/1997 |
| EP | 0 794 670 A2 | 9/1997 |
| EP | 0 911 808 A1 | 4/1999 |
| EP | 1 298 644 A1 | 4/2003 |
| JP | 05-342260 A | 12/1993 |
| JP | 8-248980 A | 9/1996 |
| JP | 9-171395 A | 6/1997 |
| JP | 11-231886 A | 8/1999 |
| JP | 11-237896 A | 8/1999 |
| JP | 11-311996 A | 11/1999 |
| JP | 11-312073 A | 11/1999 |
| JP | 2001-22374 A | 1/2001 |
| JP | 2001-42884 A | 2/2001 |

(Continued)

*Primary Examiner* — Abul K Azad
(74) *Attorney, Agent, or Firm* — Birch, Stewart, Kolasch & Birch, LLP

(57) ABSTRACT

A voice recognition apparatus 10, which performs voice recognition of an input voice by referring to a voice recognition dictionary and outputs a voice recognition result, has an external information acquiring section 14 for acquiring from externally connected devices 20-1-20-N connected thereto a type of each externally connected device, and for acquiring data recorded in each externally connected device; a vocabulary extracting analyzing section 15 and 16 for extracting a vocabulary item from the data as an extracted vocabulary item, and for producing analysis data by analyzing the extracted vocabulary item and by providing the extracted vocabulary item with reading; and a dictionary generating section 17 for storing the analysis data in the voice recognition dictionary corresponding to the type. For each type of the externally connected devices, one of the voice recognition dictionaries 13-1-13-N is assigned.

5 Claims, 8 Drawing Sheets

FOREIGN PATENT DOCUMENTS

| | | |
|---|---|---|
| JP | 2001-92485 A | 4/2001 |
| JP | 2001-296881 A | 10/2001 |
| JP | 2002-91755 A | 3/2002 |
| JP | 2002-351652 A | 12/2002 |
| JP | 2003-255982 A | 9/2003 |
| JP | 2003-271183 A | 9/2003 |
| JP | 2004-233577 A | 8/2004 |
| WO | WO-02/01550 A1 | 1/2002 |

* cited by examiner

FIG. 8
(a)
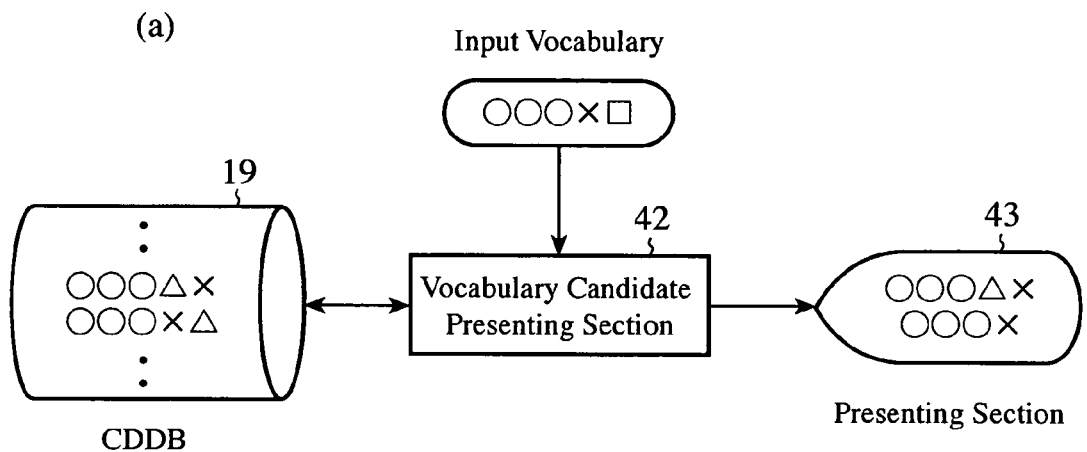
(b)
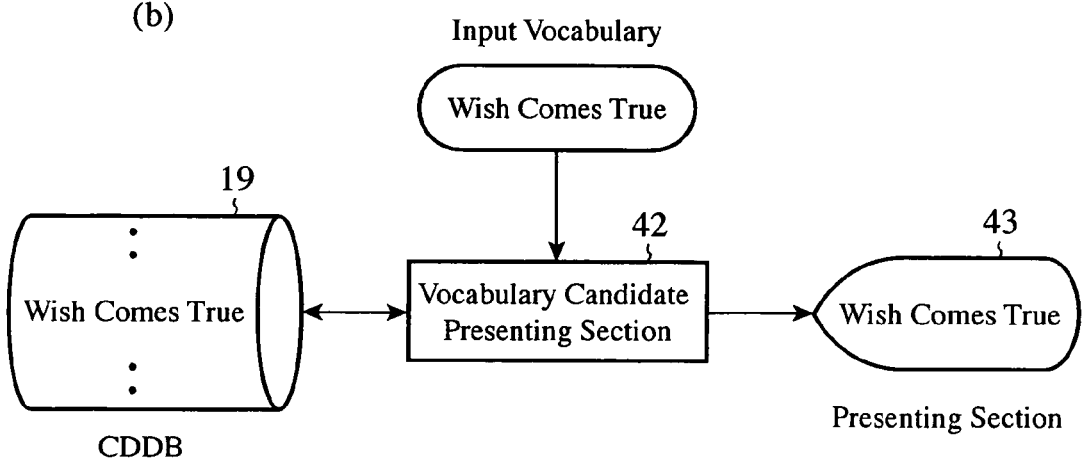

SPEECH RECOGNITION APPARATUS

TECHNICAL FIELD

The present invention relates to a speech recognition apparatus that has a plurality of speech recognition dictionaries and carries out speech recognition, and particularly to a speech recognition apparatus having a speech recognition dictionary corresponding to externally connected devices such as a mobile phone.

BACKGROUND ART

Generally, a speech recognition apparatus performs speech recognition by referring to words (vocabulary items) recorded in a speech recognition dictionary, and a large number of words must be recorded in the speech recognition dictionary to increase a speech recognition rate. Thus, some speech recognition apparatuses have a function of updating the speech recognition dictionary by enabling a user to add and record words into an existing speech recognition dictionary, and/or a function of preparing a speech recognition dictionary for user's personal use.

For example, there is a speech recognition apparatus that reads, when detecting the start of mail preparing processing during the creation of a speech recognition dictionary used for composing an e-mail message in response to a voice input, document data obtained by an application; analyzes the document data; extracts an unknown word not contained in the existing speech recognition dictionary; and creates a speech recognition dictionary including the unknown word extracted (see Patent Document 1, for example).

Furthermore, there is a speech recognition apparatus that stores, when creating/updating a speech recognition dictionary, a first analysis dictionary in which written forms and reading of popular vocabulary items are recorded into a first analysis dictionary storage section; stores a second analysis dictionary in which written forms and reading of special vocabulary items are recorded into a second analysis dictionary storage section; carries out morphological analysis using both the analysis dictionaries with a text analysis section; records in a corresponding table, when giving reading to an input morpheme by a reading providing section 2, pairs of vocabulary/reading of the second analysis dictionary and pairs of other candidates/reading candidates concerning recorded vocabulary in the second analysis dictionary; creates a speech recognition dictionary with a speech recognition dictionary creating section on a basis of the contents of the corresponding table; and creates the speech recognition dictionary on a basis of correspondence between the recognized vocabulary items and the phonemic written form and other phonemic written form candidates of the second analysis dictionary (see Patent Document 2, for example).

Patent Document 1: Japanese Patent Laid-Open No. 2004-233577 (pp. 3-9 and FIGS. 1-9).

Patent Document 2: Japanese Patent Laid-Open No. 2003-271183 (pp. 6-12 and FIGS. 1-7).

In the conventional speech recognition apparatus with the foregoing configuration, a target at the time of creating or updating the speech recognition dictionary is limited to such an application capable of transmitting and receiving document data, and the frequency of using words for the recognition can vary greatly depending on the externally connected devices connected to the speech recognition apparatus, and the words and vocabulary items can differ depending on the externally connected devices. Considering these factors, the conventional speech recognition apparatus has a problem of being unable to carry out the speech recognition efficiently for separate externally connected devices by only creating or updating the speech recognition dictionary for a single application (that is, for a single externally connected device).

In addition, since the conventional speech recognition apparatus records the words passing through the analysis into the single speech recognition dictionary, the time taken for searching the speech recognition dictionary increases with the number of words recorded. This offers a problem of not only hindering the efficient speech recognition, but also reducing the recognition rate because of an increase in similar words.

The present invention is implemented to solve the foregoing problems. Therefore it is an object of the present invention to provide a speech recognition apparatus capable of carrying out the speech recognition efficiently in accordance with the externally connected devices.

DISCLOSURE OF THE INVENTION

The speech recognition apparatus in accordance with the present invention, which carries out speech recognition of an input voice by referring to a speech recognition dictionary and outputs a speech recognition result, is characterized by including: an external information acquiring section for acquiring from an externally connected device connected thereto a type of the externally connected device, and for acquiring data recorded in the externally connected device; a vocabulary extracting analyzing section for extracting a vocabulary item from the data as an extracted vocabulary item, and for producing analysis data by analyzing the extracted vocabulary item and by providing the extracted vocabulary item with reading; and a dictionary generating section for storing the analysis data in the speech recognition dictionary corresponding to the type, wherein the speech recognition dictionary is provided for each type of the externally connected device.

As described above, according to the present invention, the apparatus is configured in such a manner as to make a decision as to the speech recognition result whether it is erroneous recognition or not, and to switch, if a decision of erroneous recognition is made, the speech recognition dictionary to continue the speech recognition processing. Thus, the apparatus can carry out the speech recognition with switching the speech recognition dictionary without any special operation of the user. As a result, it offers an advantage of being able to shorten the speech recognition processing time, and to improve the recognition rate.

BRIEF DESCRIPTION OF THE DRAWINGS

FIG. 8 is a diagram showing the operation of a vocabulary candidate presenting section in the speech recognition apparatus as shown in FIG. 6, in which (a) and (b) are diagrams each showing a vocabulary candidate presented by the vocabulary candidate presenting section.

BEST MODE FOR CARRYING OUT THE INVENTION

The best mode for carrying out the invention will now be described with reference to the accompanying drawings to explain the present invention in more detail.

Embodiment 1

Figure 1:
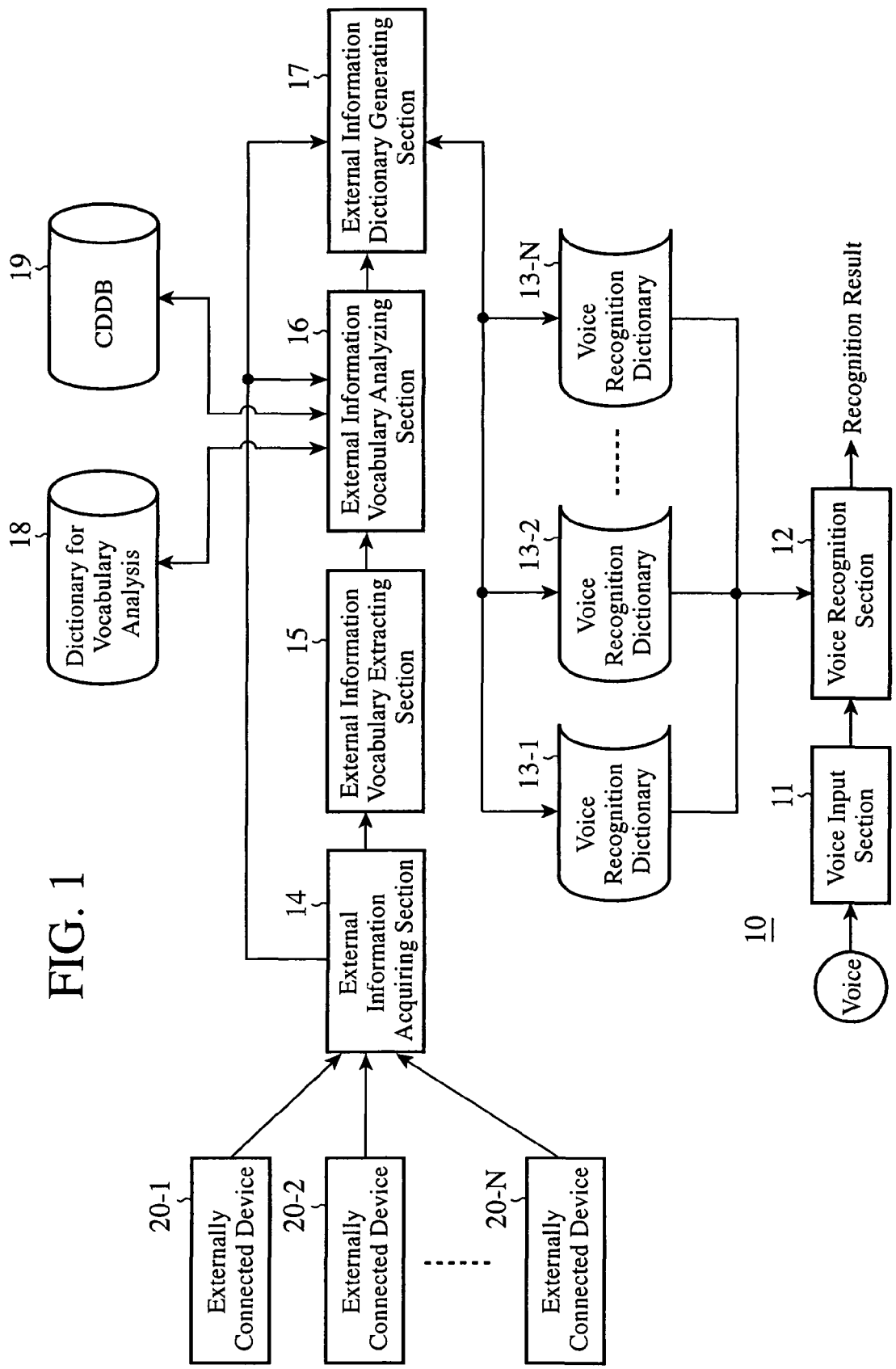
FIG. 1 is a block diagram showing a configuration of a speech recognition apparatus of an embodiment 1 in accordance with the present invention together with externally connected devices.

FIG. 1 is a block diagram showing a configuration of the speech recognition apparatus of an embodiment 1 in accordance with the present invention together with externally connected devices. The speech recognition apparatus 10 shown in FIG. 1 is used for a car navigation system, for example. The speech recognition apparatus 10 includes a voice input section 11 such as a microphone, a speech recognition section 12, and a plurality of speech recognition dictionaries (referred to as "dictionaries" from now on) 13-1 to 13-N (where N is an integer equal to or greater than two). In addition, it includes an external information acquiring section 14, an external information vocabulary extracting section 15, an external information vocabulary analyzing section 16, an external information dictionary generating section (dictionary generating section) 17, dictionary for vocabulary analysis 18, and a CDDB (compact disk database: a database for providing information about pieces recorded in a music CD to CD playback software or peripheral equipment) 19. Then, a plurality of externally connected devices 20-1 to 20-N are connected to the external information acquiring section 14.

Here, the external information vocabulary extracting section 15, external information vocabulary analyzing section 16, dictionary for vocabulary analysis 18, and CDDB 19 constitute a vocabulary extracting analyzing section; and the dictionary for vocabulary analysis 18 and CDDB 19 constitute an analysis dictionary.

The externally connected devices 20-1 to 20-N are, for example, a mobile phone, a small-sized music player (such as an iPod (brand name)), a keyboard, and a PDA (Personal Digital Assistant), which differ from each other, and the dictionaries 13-1 to 13-N correspond to the externally connected devices 20-1 to 20-N.

To carry out the speech recognition, the speech recognition section 12 receives a voice input via the voice input section 11, recognizes the input voice by referring to one of the dictionaries 13-1 to 13-N generated as will be described later, and outputs a speech recognition result. Thus, to carryout the speech recognition as to the externally connected device 20-$n$ ($n$ is one of the integers from one to N), the speech recognition section 12 uses the dictionary 13-$n$.

Incidentally, in the car navigation system, for example, picture transition or operation of the externally connected device 20-$n$ is performed in response to the speech recognition result, and the picture after the transition or the operation result of the externally connected device is displayed on a monitor.

Next, the operation will be described.

Figure 2:
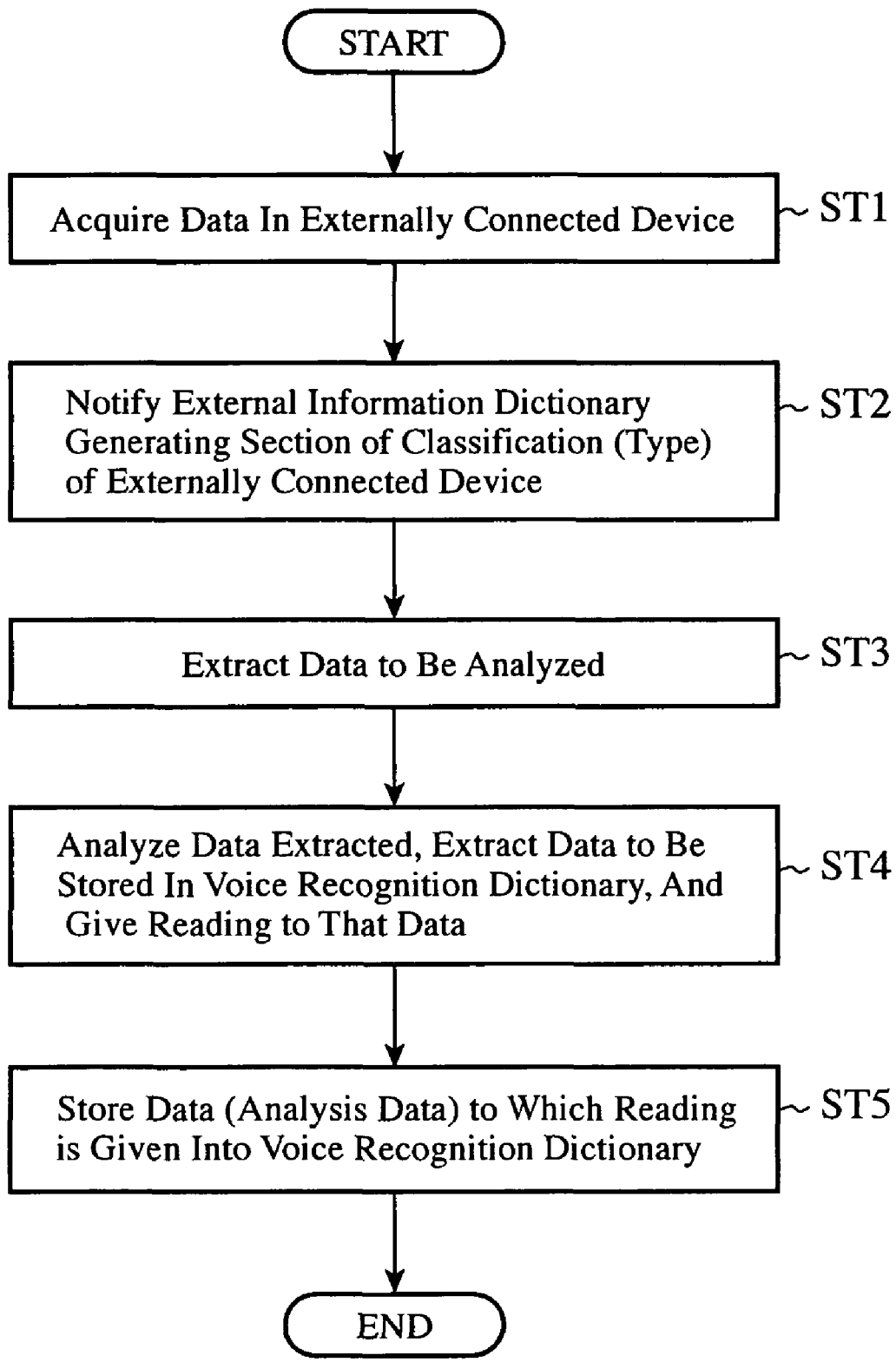
FIG. 2 is a flowchart illustrating vocabulary recording into a speech recognition dictionary in the speech recognition apparatus as shown in FIG. 1.

Referring to FIG. 1 and FIG. 2, generation of the dictionaries 13-1 to 13-N will be described. First, when the externally connected device 20-$n$ is connected to the external information acquiring section 14, the externally connected device 20-$n$ provides an ID signal for identifying it to the external information acquiring section 14. Thus, the external information acquiring section 14 decides the type of the externally connected device 20-$n$.

Subsequently, the external information acquiring section 14 acquires data (such as a received mail message in the case of the mobile phone, or a title, artist name and album name in the case of the iPod) stored in the externally connected device 20-$n$ (step ST1). After that, the external information acquiring section 14 notifies the external information dictionary generating section 17 of the classification (type) of the externally connected device 20-$n$ (step ST2). Here, if the externally connected device 20-$n$ connected to the external information acquiring section 14 is changed, steps ST1 and ST2 are executed in the same manner.

The data the external information acquiring section 14 obtains is delivered to the external information vocabulary extracting section 15, which extracts a portion to be analyzed (such as the text of the received mail message, or the title, artist name or album name), and delivers it to the external information vocabulary analyzing section 16 as extracted data (step ST3).

The external information vocabulary analyzing section 16 carries out, when the extracted data is a text such as a mail message, the morphological analysis; divides the text into words by referring to the dictionary for vocabulary analysis 18; and obtains analysis data by providing each word with the reading thereof acquired at the analysis (step ST4). In contrast, when the extracted data is a word such as the title or artist name, the external information vocabulary analyzing section 16 searches the CDDB 19 using its written form as a key, acquires its reading, and forms the analysis data by providing the reading to the vocabulary item.

The analysis data is delivered from the external information vocabulary analyzing section 16 to the external information dictionary generating section 17. According to the externally connected device type delivered from the external information acquiring section 14, the external information dictionary generating section 17 stores the analysis data in the dictionary 13-$n$ corresponding to the externally connected device 20-$n$ (step ST5). In this way, the dictionaries 13-1 to 13-N corresponding to the externally connected devices 20-1 to 20-N are generated.

These dictionaries 13-1 to 13-N are stored in a dictionary storage area in the memory, and are not deleted by a person except for a predetermined user. Thus, every time the speech recognition apparatus 10 is started or the externally connected device 20-$n$ is switched, the dictionary 13-$n$ corresponding to the externally connected device 20-$n$ is used.

Figure 3:
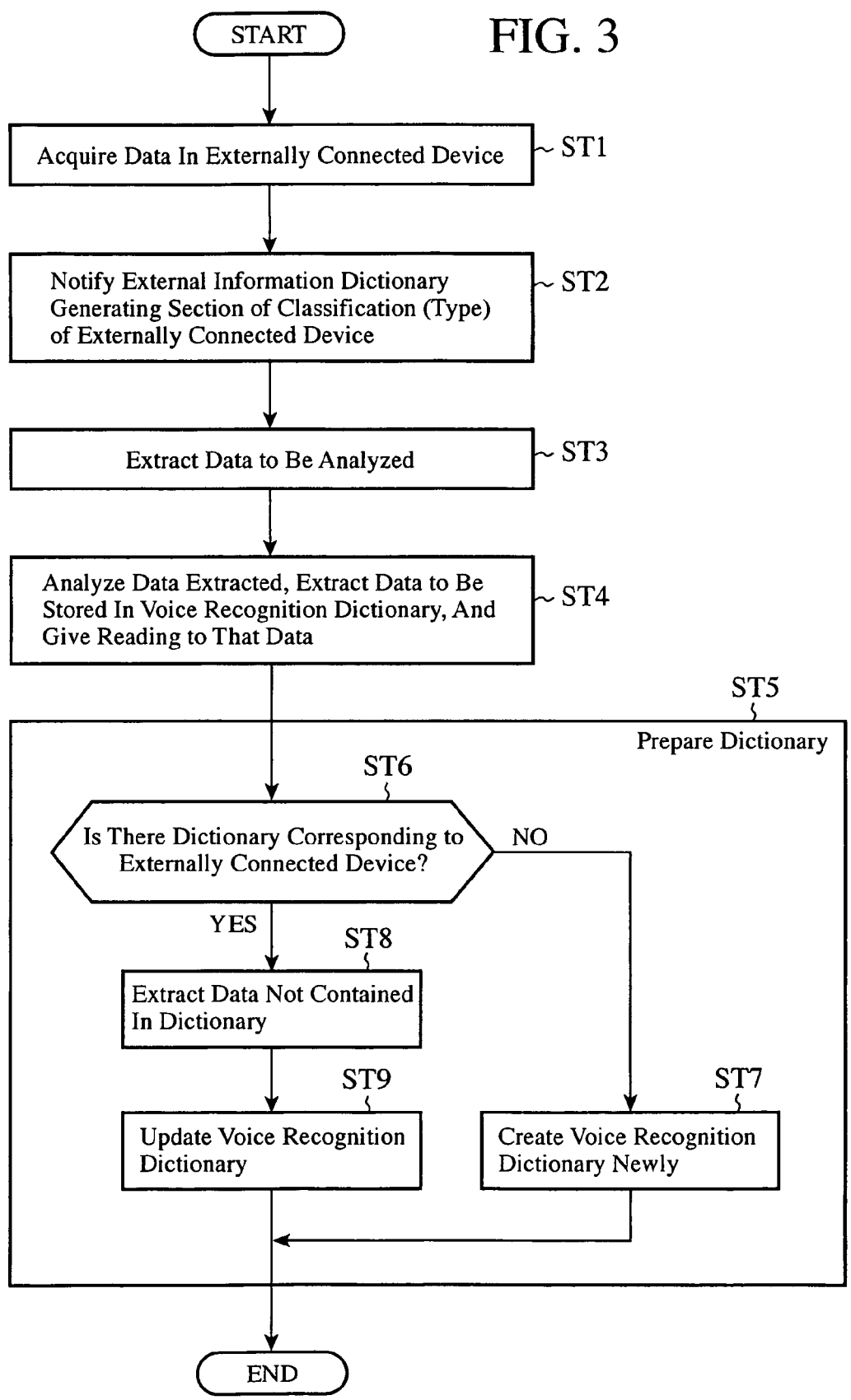
FIG. 3 is a flowchart illustrating update and new creation of the speech recognition dictionary in the speech recognition apparatus as shown in FIG. 1.

Subsequently, the foregoing step ST5 will be described in more detail with reference to FIG. 3. When storing the analysis data in the dictionary 13-$n$, the external information dictionary generating section 17 makes a decision as to whether the corresponding dictionary 13-$n$ is present or not according to the type of the externally connected device 20-$n$ (type deciding section: step ST6). Unless the corresponding dictionary 13-$n$ is present, the external information dictionary generating section 17 newly creates the dictionary 13-$n$ in the dictionary storage area (dictionary creating section: step ST7), and stores the analysis data in the new dictionary 13-*n*.

In contrast, when making a decision at step ST6 that the dictionary 13-*n* corresponding to the externally connected device 20-*n* is present, the external information dictionary generating section 17 decides as to whether the vocabulary item corresponding to the analysis data is present or not by looking over the vocabulary items in the dictionary 13-*n*. Thus, the external information dictionary generating section 17 extracts the data not present in the dictionary 13-*n* from the analysis data (step ST8), and stores only the analysis data not present in the dictionary 13-*n* in the dictionary 13-*n*, thereby updating the dictionary 13-*n* (dictionary updating section: step ST9). Then, the external information dictionary generating section 17 deletes the analysis data already present in the dictionary 13-*n*.

When updating the dictionary, it is also possible to delete the vocabulary items not contained in the analysis data from the vocabulary items present in the dictionary. This makes it possible to prevent an increase in the amount of data stored in the dictionary, and as a result to carry out the speech recognition efficiently.

As described above, the present embodiment 1 is configured in such a manner as to generate the dictionary according to the type of the externally connected device. Thus, using the dictionary for each externally connected device to carry out the speech recognition can increase not only the recognition efficiency, but also the recognition rate. This offers an advantage of being able to operate the externally connected devices easily by voice input.

According to the present embodiment 1, by connecting the externally connected device to the external information acquiring section, the corresponding dictionary is automatically updated. As a result, it offers an advantage of being able to update the dictionary without user intervention.

Embodiment 2

Figure 4:
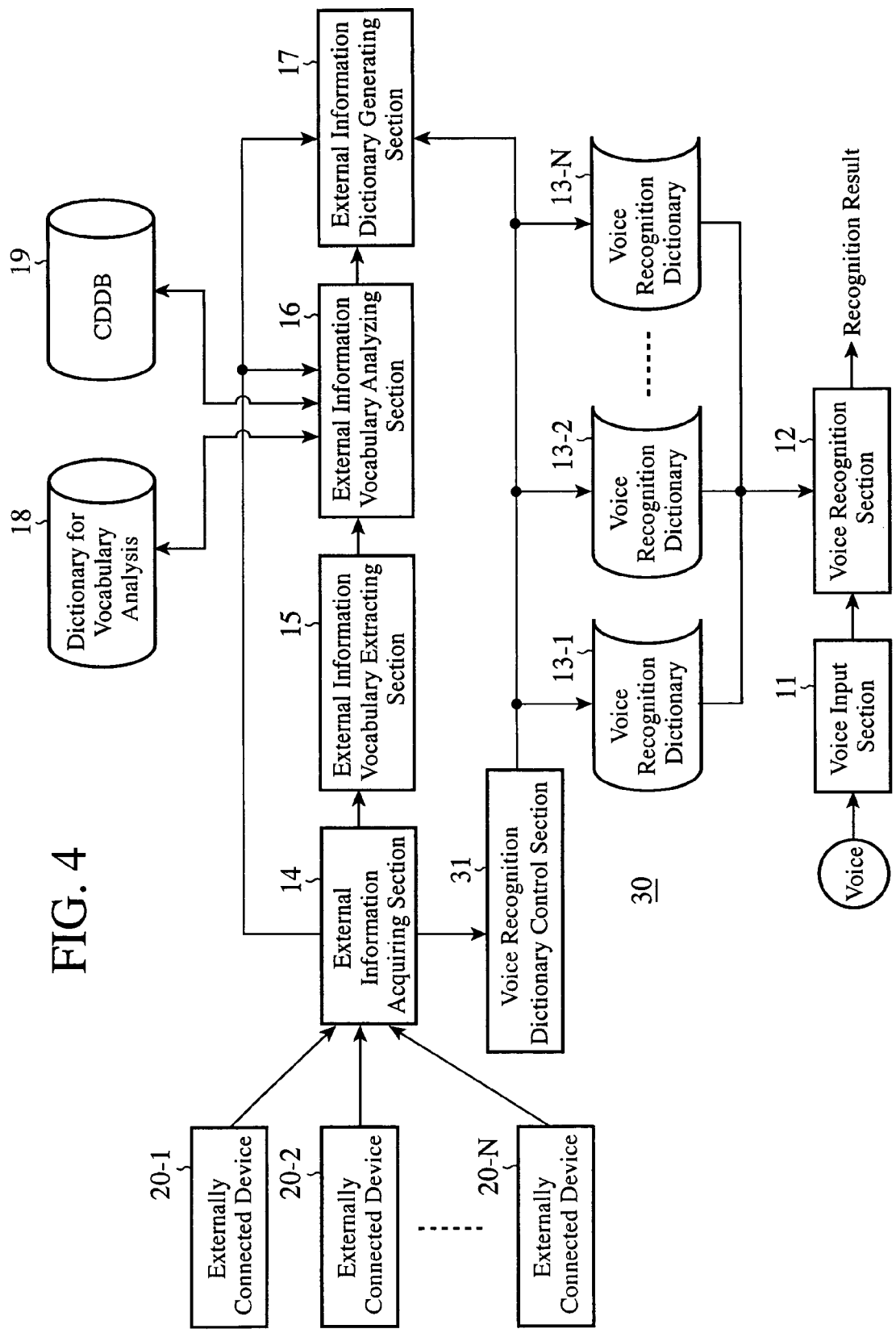
FIG. 4 is a block diagram showing a configuration of the speech recognition apparatus of an embodiment 2 in accordance with the present invention together with externally connected devices.

FIG. 4 is a block diagram showing a configuration of the speech recognition apparatus of an embodiment 2 in accordance with the present invention. In the speech recognition apparatus 30 as shown in FIG. 4, the same components as those of the speech recognition apparatus 10 as shown in FIG. 1 are designated by the same reference numerals. The speech recognition apparatus 30 further includes a speech recognition dictionary control section 31. The external information acquiring section 14 notifies the speech recognition dictionary control section 31 of the type of the externally connected device 20-*n* as well.

Figure 5:
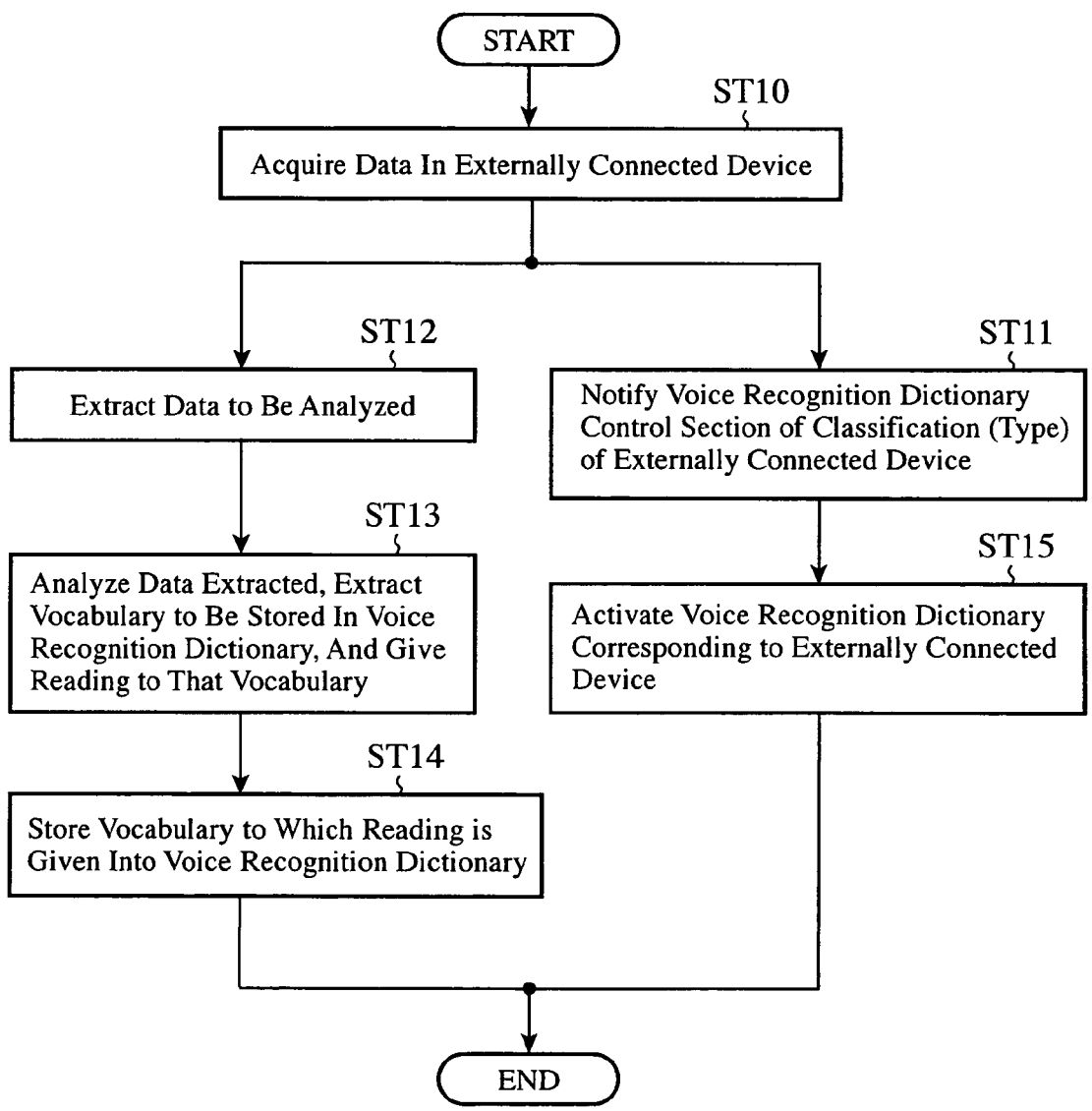
FIG. 5 is a flowchart illustrating the operation of activating the speech recognition dictionary in the speech recognition apparatus as shown in FIG. 4.

Referring to FIG. 5, when the externally connected device 20-*n* is changed, the external information acquiring section 14 acquires the data from the externally connected device 20-*n* (step ST10) as described before, and then notifies the external information dictionary acquiring section 17 of the type of the external information equipment 20-*n*, and notifies the speech recognition dictionary control section 31 of the type of the external information equipment 20-*n* (step ST11).

As described in connection with FIG. 1, the external information vocabulary extracting section 15 extracts a portion to be analyzed from the data acquired by the external information acquiring section 14 as the extracted data, and delivers it to the external information vocabulary analyzing section 16 (step ST12). Then, referring to the dictionary for vocabulary analysis 18 or CDDB 19, the external information vocabulary analyzing section 16 obtains the analysis data (the vocabulary items to which the reading is provided) (step ST13). According to the externally connected device type delivered from the external information acquiring section 14, the external information dictionary generating section 17 stores the analysis data in the dictionary 13-*n* corresponding to the externally connected device 20-*n* (step ST14).

On the other hand, the speech recognition dictionary control section 31 activates the dictionary 13-*n* corresponding to the externally connected device 20-*n* in accordance with the type of the externally connected device (step ST15). If a plurality of externally connected devices are connected to the external information acquiring section 14, the dictionaries each corresponding to one of the plurality of externally connected devices are made active.

As described above, the present embodiment 2 is configured in such a manner as to activate the corresponding dictionary according to the type of the externally connected device. Thus, when carrying out the speech recognition, the dictionary is automatically switched by connecting the externally connected device to the external information acquiring section. As a result, the present embodiment 2 offers an advantage of enabling the user to perform the voice input without conscious of switching the dictionary.

The present embodiment 2 activates only the dictionary corresponding to the externally connected device connected to the external information acquiring section. As a result, it can not only reduce the number of dictionaries to be consulted at the speech recognition, but also carry out the speech recognition efficiently. Accordingly, it offers an advantage of being able to improve the recognition rate.

Embodiment 3

Figure 6:
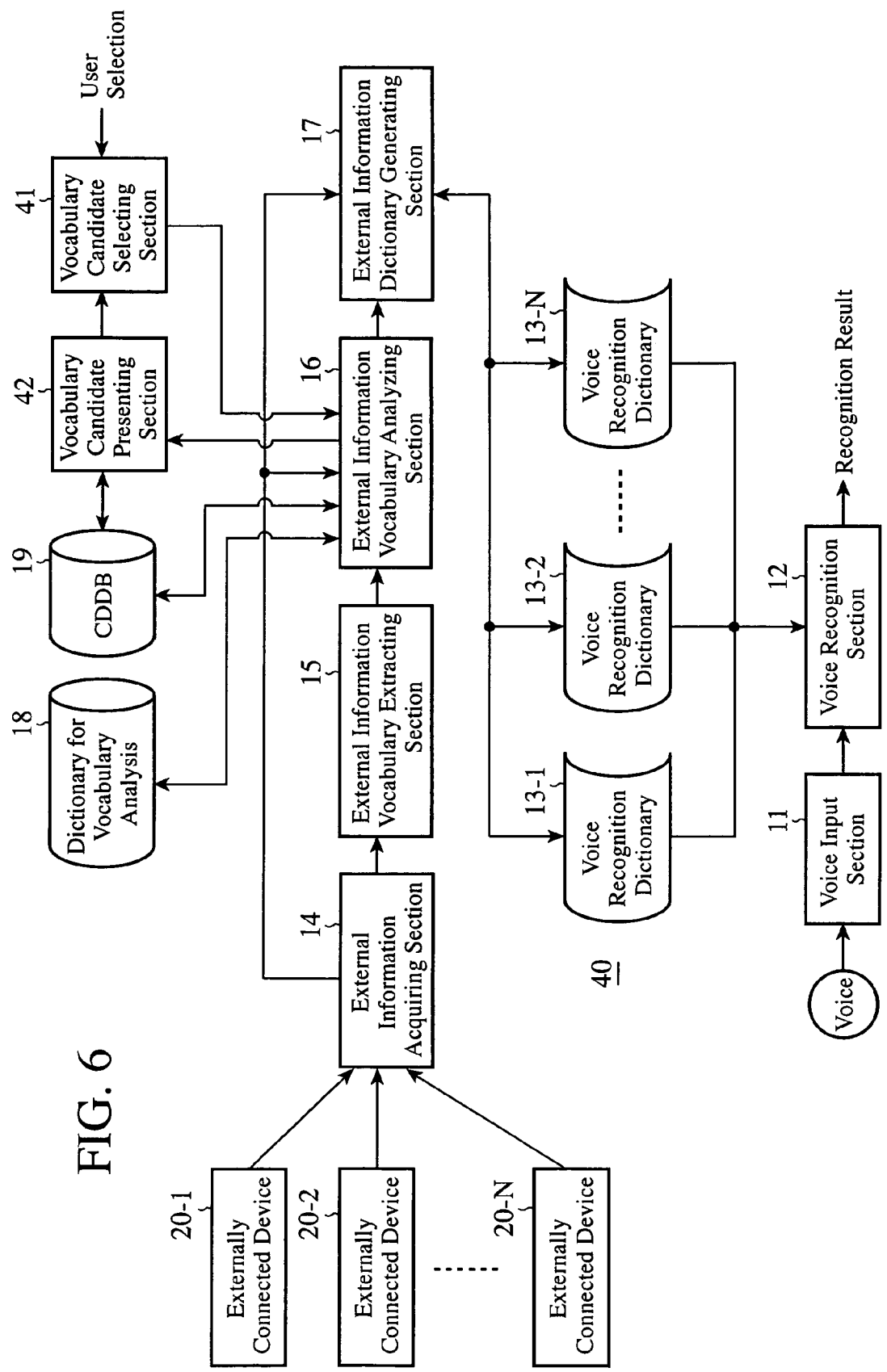
FIG. 6 is a block diagram showing a configuration of the speech recognition apparatus of an embodiment 3 in accordance with the present invention together with externally connected devices.

FIG. 6 is a block diagram showing a configuration of the speech recognition apparatus of an embodiment 3 in accordance with the present invention. In the speech recognition apparatus 40 as shown in FIG. 6, the same components as those of the speech recognition apparatus 10 as shown in FIG. 1 are designated by the same reference numerals. The speech recognition apparatus 40 further includes a vocabulary candidate selecting section 41 and a vocabulary candidate presenting section 42. As will be described later, if the analysis data (vocabulary item to which the reading is given) the external information vocabulary analyzing section 16 obtains as a result of analyzing the data (vocabulary item) extracted by the external information vocabulary extracting section 15 has fluctuation (such as a case where a plurality of vocabulary candidates are present), the external information vocabulary analyzing section 16 notifies the vocabulary candidate presenting section 42 of that.

The vocabulary candidate presenting section 42 displays the plurality of vocabulary candidates on a monitor (not shown), for example, and prompts the user to select. When the user selects one of the plurality of vocabulary candidates with the vocabulary candidate selecting section 41 as a selected vocabulary item, the selected vocabulary item is provided to the external information vocabulary analyzing section 16. The external information vocabulary analyzing section 16 delivers the selected vocabulary item to the external information dictionary generating section 17 as the analysis data. Then, the external information dictionary generating section 17 stores the analysis data into the dictionary 13-*n* corresponding to the externally connected device 20-*n* according to the externally connected device type delivered from the external information acquiring section 14.

Figure 7:
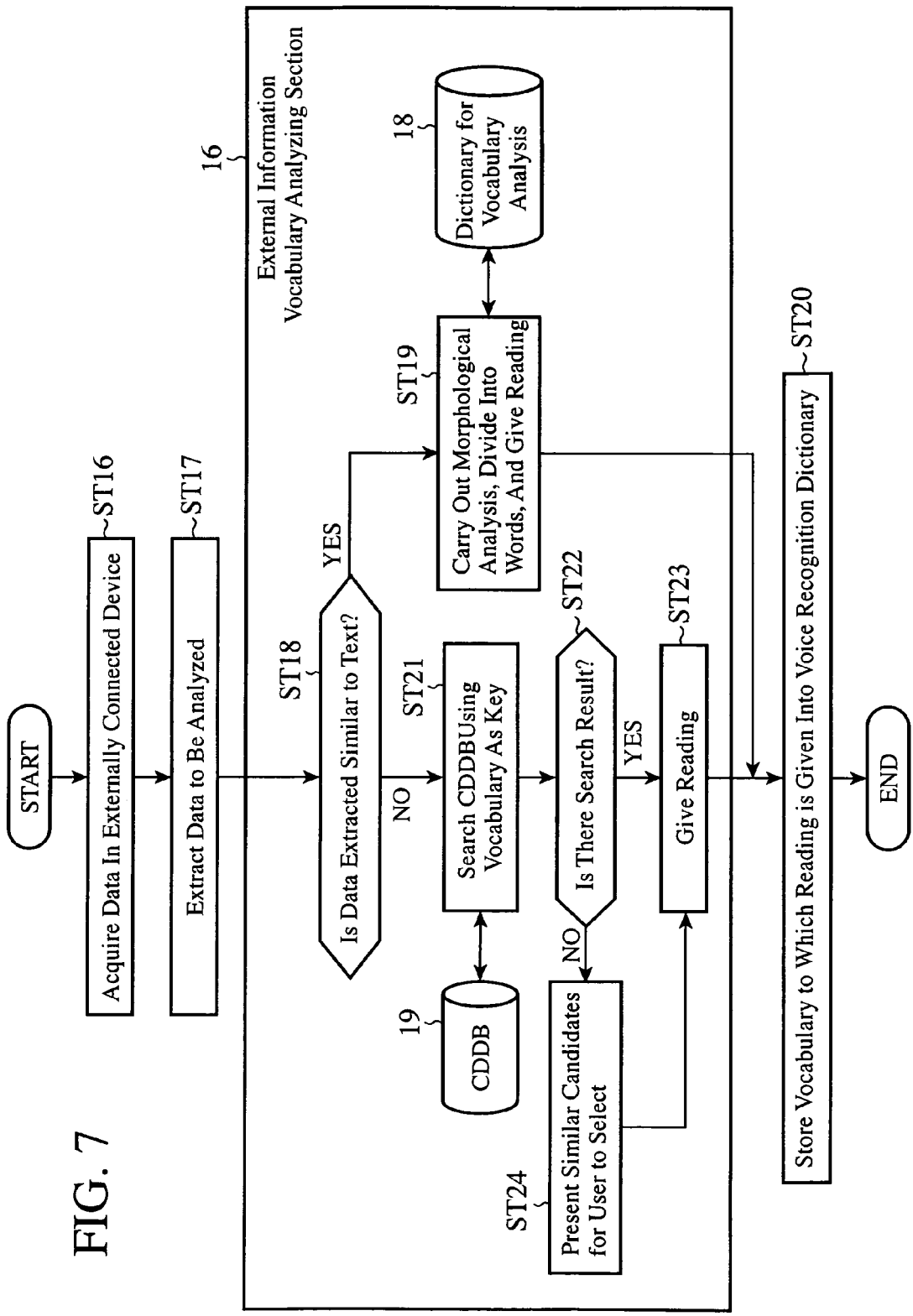
FIG. 7 is a flowchart illustrating the operation of an external information vocabulary analyzing section in the speech recognition apparatus as shown in FIG. 6.

Referring to FIG. 7 and FIG. 8, when a music data playback device such as an iPod is connected to the external information acquiring section 14 as the externally connected device 20-*n*, the external information acquiring section 14 delivers the type of the externally connected device 20-*n* to the external information dictionary generating section 17; and acquires the data from the externally connected device 20-*n* (step ST16), and sends the data to the external information vocabulary extracting section 15 as described before.

The external information vocabulary extracting section 15 extracts a portion to be analyzed from the data acquired by the external information acquiring section 14 (here, the data such as a title, artist name, and album name is extracted: step ST17), and delivers the data to the external information vocabulary analyzing section 16 as the extracted data. The external information vocabulary analyzing section 16 makes a decision as to whether the extracted data is text such as a mail message or not (step ST18). When the extracted data is text, the external information vocabulary analyzing section 16 carries out the morphological analysis, divides the text into words (vocabulary items) by referring to the dictionary for vocabulary analysis 18, and obtains the analysis data by providing the individual words with the reading obtained during the analysis (step ST19).

The external information vocabulary analyzing section 16 delivers the analysis data to the external information dictionary generating section 17. The external information dictionary generating section 17 stores the analysis data into the dictionary 13-*n* corresponding to the type of the externally connected device 20-*n* delivered from the external information acquiring section 14 (step ST20).

In contrast, unless a decision is made that the extracted data is text at step ST18, the external information vocabulary analyzing section 16 searches the CDDB 19 using the written form as a key (step ST21), and makes a decision as to whether a vocabulary item, a search result, is present or not (that is, whether a matching vocabulary item is present or not: step ST22). If a matching vocabulary item is present, the external information vocabulary analyzing section 16 provides the vocabulary item with the reading to produce the analysis data (step ST23). After that, the external information dictionary generating section 17 executes step ST20.

If the title, artist name, or album name has fluctuation, the CDDB 19 will not include the vocabulary item matching the extracted data. Thus, at step ST22, the external information vocabulary analyzing section 16 makes a decision that the search result is not present. For example, as shown in FIG. 8(*a*), if the written form of the data recorded in the externally connected device 20-*n* is "○○○X□" and the written forms of the vocabulary items recorded in the CDDB 19 are "○○○△X", "○○○X△" and so on, the CDDB 19 does not have the recorded vocabulary item matching the extracted data. In this case, the external information vocabulary analyzing section 16 selects vocabulary items similar to the extracted data as vocabulary candidates (step ST24), and the vocabulary candidate presenting section 42 presents the vocabulary candidates on a monitor (presenting section) 43.

As for the example shown in FIG. 8(*a*), the presenting section 43 exhibits "○○○△X" and "○○○X" as the vocabulary candidates. When the user selects one of the vocabulary candidates as the selected vocabulary item with the vocabulary candidate selecting section 41, the external information vocabulary analyzing section 16 provides the selected vocabulary item with the reading to make the analysis data at step ST23. After that, the external information dictionary generating section 17 executes step ST20.

When making a decision as to the degree of similarity between the extracted data and the recorded vocabulary items, the external information vocabulary analyzing section 16 obtains the degree of similarity (the ratio of the number of erroneous letters and characters to the number of letters and characters) using the string lengths of the written form of the extracted data and the written form of the recorded vocabulary item or the number of matching letters and characters between them, or the string lengths of the kana obtained by conversion or the number of matching letters and characters between them. For example, the degree of similarity has a range from zero (disagree completely) to 100 (agree completely), and if the degree of similarity is greater than a prescribed threshold value (80, for example), the external information vocabulary analyzing section 16 causes the vocabulary candidate presenting section 42 to exhibit the vocabulary item on the presenting section 43 as the vocabulary candidate. In the example shown in the drawing, steps ST22 and ST24 correspond to a resembling vocabulary deciding section.

In the example shown in FIG. 8(*b*), the written form of the data recorded in the externally connected device 20-*n* is "wish comes true", and the written form of the vocabulary item recorded in the CDDB 19 is "wish come true" and so on. In this case, the recorded vocabulary item matching the extracted data is not present in the CDDB 19. However, according to the resemblance decision, the external information vocabulary analyzing section 16 causes the vocabulary candidate presenting section 42 to exhibit "wish come true" on the presenting section 43 as the vocabulary candidate.

As described above, the present embodiment 3 is configured in such a manner as to present, even if the externally connected devices do not include the vocabulary item matching the written form of the recorded data, the similar vocabulary candidates, and to record, when the user selects one of the vocabulary candidates, the selected one in the dictionary as the selected vocabulary item. Thus, the present embodiment 3 offers an advantage of being able to improve the accuracy of the vocabulary items in the dictionary and to reduce the erroneous recognition rate.

INDUSTRIAL APPLICABILITY

As described above, the speech recognition apparatus in accordance with the present invention can carry out the speech recognition efficiently in conformity to the externally connected devices, and hence is suitable as the speech recognition apparatus applied to mobile phones, for example.

What is claimed is:

1. A speech recognition apparatus comprising:
   an external information acquiring section configured to acquire, from an externally connected device connected to the speech recognition apparatus, a device type of the externally connected device, and for acquiring data recorded in said externally connected device;
   a vocabulary extracting analyzing section configured to extract a vocabulary item as an extracted vocabulary item form the data acquired by the external information acquiring section, and to produce analysis data by providing the extracted vocabulary item with pronunciation obtained through analysis of said extracted vocabulary item;
   a dictionary generating section for configured to generate speech recognition dictionaries according to device types of externally connected devices by storing the analysis data produced by the vocabulary extracting analyzing section into a speech recognition dictionary corresponding to the device type acquired by the external information acquiring section; and
   a speech recognition section configured to carry out speech recognition of input speech by referring to a speech recognition dictionary out of the speech recognition dictionaries generated by the dictionary generating section, and to output a result of said speech recognition, where the speech recognition dictionary to be used for said speech recognition corresponds to the device type acquired by the external information acquiring section.

2. The speech recognition apparatus according to claim 1, wherein said dictionary generating section comprises:
   a type deciding section for configured to decide whether the speech recognition dictionary corresponding to the device type acquired by the external information acquiring section is present or not;
   a dictionary creating section configured to newly create a speech recognition dictionary corresponding to the device type when a decision made by the type deciding section indicates negative, and to store the analysis data into the newly created speech recognition dictionary; and
   a dictionary updating section configured to update the speech recognition dictionary corresponding to the device type by storing data of the analysis data into said speech recognition dictionary when a decision made by the type deciding section indicates positive, where the data to be stored is not present in said speech recognition dictionary.

3. The speech recognition apparatus according to claim 1, further comprising a speech recognition dictionary control section configured to activate only the speech recognition dictionary corresponding to the device type acquired by the external information acquiring section.

4. The speech recognition apparatus according to claim 1, wherein said vocabulary extracting analyzing section comprises:
   an analysis dictionary used for analyzing the extracted vocabulary item; and
   a resembling vocabulary deciding section configured to decide, when a vocabulary item matching the extracted vocabulary item is present in said analysis dictionary, as to whether a vocabulary item similar to the extracted vocabulary item is present in said analysis dictionary or not, wherein said speech recognition apparatus further comprises:
   a vocabulary candidate presenting section for configured to exhibit the similar vocabulary item as a vocabulary candidate when a decision made by the resembling vocabulary deciding section indicates positive.

5. The speech recognition apparatus according to claim 4, further comprising a vocabulary candidate selecting section configured to recognize one of vocabulary candidates selected by a user of the speech recognition apparatus as a selected vocabulary item,
   wherein said vocabulary extracting analyzing section produces analysis data by providing the selected vocabulary item with pronunciation of said selected vocabulary item.

* * * * *